(12) United States Patent
Chuang

(10) Patent No.: US 7,053,900 B2
(45) Date of Patent: May 30, 2006

(54) PERSONAL COMPUTER SYSTEM AND CORE LOGIC CHIP APPLIED TO SAME

(75) Inventor: Eric Chuang, Taipei (TW)

(73) Assignee: Via Technologies, Inc., Taipei (TW)

( * ) Notice: Subject to any disclaimer, the term of this patent is extended or adjusted under 35 U.S.C. 154(b) by 93 days.

(21) Appl. No.: 10/647,803

(22) Filed: Aug. 25, 2003

(65) Prior Publication Data

US 2004/0046762 A1 Mar. 11, 2004

(30) Foreign Application Priority Data

Sep. 11, 2002 (TW) .............................. 91120792 A

(51) Int. Cl.
*G06T 1/00* (2006.01)
*G06F 15/76* (2006.01)
*G06G 13/14* (2006.01)

(52) U.S. Cl. ..................... 345/503; 345/519; 345/520

(58) Field of Classification Search ................ 345/503, 345/519, 520, 531, 536, 538, 541, 542, 545, 345/564

See application file for complete search history.

(56) References Cited

U.S. PATENT DOCUMENTS

| | | | |
|---|---|---|---|
| 5,828,385 A * | 10/1998 | Smith et al. ................ | 346/74.2 |
| 5,844,576 A * | 12/1998 | Wilde et al. ................ | 345/544 |
| 5,990,912 A * | 11/1999 | Swanson ..................... | 345/568 |
| 6,072,507 A * | 6/2000 | Balatsos et al. ............. | 345/569 |
| 6,205,531 B1 * | 3/2001 | Hussain ....................... | 711/207 |
| 6,247,084 B1 * | 6/2001 | Apostol et al. ............. | 710/108 |
| 6,496,193 B1 * | 12/2002 | Surti et al. ................... | 345/552 |
| 6,628,294 B1 * | 9/2003 | Sadowsky et al. .......... | 345/568 |
| 6,667,745 B1 * | 12/2003 | Hussain ....................... | 345/545 |
| 6,839,063 B1 * | 1/2005 | Nakatsuka et al. ......... | 345/534 |
| 6,856,320 B1 * | 2/2005 | Rubinstein et al. ......... | 345/543 |
| 6,885,378 B1 * | 4/2005 | Tsai et al. .................... | 345/557 |
| 2003/0001853 A1 * | 1/2003 | Obayashi ..................... | 345/568 |
| 2003/0122837 A1 * | 7/2003 | Saxena et al. .............. | 345/566 |

* cited by examiner

*Primary Examiner*—Kee M. Tung
(74) *Attorney, Agent, or Firm*—Madson & Austin

(57) ABSTRACT

A personal computer system includes a core logic unit, a graphics accelerator, a first tile converter, a local memory, a second tile converter and a system memory. The core logic unit outputs first image data in a linear mode. The graphics accelerator is in communication with the core logic unit for processing the first image data into second image data in a linear mode. The first tile converter is in communication with the graphics accelerator for converting the second image data into third image data in a tile mode. The local memory is in communication with the first tile converter for storing therein the third image data. The second tile converter is in communication with the core logic unit for converting the first image data into fourth image data in a tile mode. The system memory is accessible by the core logic unit, and includes a graphics accelerating memory in communication with the second tile converter for storing therein the fourth image data.

18 Claims, 4 Drawing Sheets

PERSONAL COMPUTER SYSTEM AND CORE LOGIC CHIP APPLIED TO SAME

FIELD OF THE INVENTION

The present invention relates to a personal computer system, and more particularly to a personal computer system involving tile-mode transfer of data. The present invention also relates to a core logic chip capable of performing tile-mode transfer of data.

BACKGROUND OF THE INVENTION

In a conventional personal computer system, as shown in FIG. 1, a core logic unit comprising a north bridge chip 11 and a south bridge chip 12 are used to control data flows among a microprocessor 10, a system memory 13, and a plurality of I/O devices including a graphics card 14. The microprocessor 10 accesses graphics data of the system memory 13 or outputs graphing commands to the graphics card 14 via the north bridge chip 11. The system memory 13 is generally a dynamic random access memory (DRAM) and comprises an AGP (Accelerated Graphics Port) memory block 131. The graphics card 14 is electrically connected to the north bridge chip 11 via an AGP bus, and comprises a graphics chip 141, a tile converter 143 and a local memory 142.

With the increasing demand of 3D graphing, the local memory 142 serves not only as a frame buffer but also as a texture buffer, a Z buffer and/or other graphics-related buffers to facilitate the improved 3D graphing functions. In order to comply with the 3D-graphing features and increase the processing speed of 3D graphics, the graphics data are stored and accessed in a so-called tile mode. However, before the graphics chip 141 stores the graphics data into the local memory 142, the graphics data are present in a linear mode. Therefore, the graphics data have to be converted into tile-mode graphics data by the tile converter 143 in advance, and then are stored in the local memory 142. As a result, the graphics data can be read and processed in a tile mode from the local memory 142 so as to enhance the data-processing speed of the graphics chip 141.

Furthermore, in addition to the local memory 142, the AGP memory block 131 of the system memory 13 is accessible by the graphics chip 141 via an AGP protocol when required. For a purpose of supporting data transmission in the tile mode, the linear-mode data stored in the AGP memory block 131 are also required to be rearranged into tile-mode data by way of software before being accessed by the graphics chip 141. As is understood, the processing speed of the system will be adversely affected by the transformation operation from a linear mode to a tile mode.

SUMMARY OF THE INVENTION

It is an object of the present invention to provide a personal computer system involving in no software transformation operation from a linear mode to a tile mode so as to increase the processing speed.

Another object of the present invention is to provide a core logic chip exempting from software transformation operation from a linear mode to a tile mode so as to increase the processing speed.

It is another object of the present invention to provide a core logic chip for performing graphing and tile-converting operations so as to save resource.

In accordance with a first aspect of the present invention, there is provided a personal computer system. The personal computer system comprises a core logic unit, a graphics accelerator, a first tile converter, a local memory, a second tile converter and a system memory. The core logic unit outputs first image data in a linear mode. The graphics accelerator is in communication with the core logic unit for processing the first image data into second image data in a linear mode. The first tile converter is in communication with the graphics accelerator for converting the second image data into third image data in a tile mode. The local memory is in communication with the first tile converter for storing therein the third image data. The second tile converter is in communication with the core logic unit for converting the first image data into fourth image data in a tile mode. The system memory is accessible by the core logic unit, and comprises a graphics accelerating memory in communication with the second tile converter for storing therein the fourth image data.

In an embodiment, the core logic unit includes a north bridge chip.

In an embodiment, the graphics accelerator is a graphics chip.

In an embodiment, the graphics accelerator, the first tile converter and the local memory are integrated into a graphics card.

In an embodiment, the core logic unit, the graphics accelerator, the first tile converter and the second tile converter are integrated into a single core logic chip.

Specially, the local memory is disposed in the system memory. More specially, the first tile converter and the second tile converter are integrated into a single tile converting device.

In an embodiment, the graphics accelerating memory is an AGP (Accelerated Graphics Port) memory in communication with the core logic unit via an AGP protocol.

In an embodiment, the personal computer system further comprises a microprocessor in communication with the core logic unit.

In accordance with a second aspect of the present invention, there is provided a personal computer system. The personal computer system comprises a core logic unit, a graphics accelerator, a tile converting device, a local memory and a system memory. The core logic unit outputs first image data in a linear mode. The graphics accelerator is in communication with the core logic unit for processing the first image data into second image data in a linear mode. The tile converting device having a first portion in communication with the graphics accelerator for converting the second image data into third image data in a tile mode and a second portion in communication with the core logic unit for converting the first image data into fourth image data in a tile mode. The local memory is in communication with the first portion of the tile converter for storing therein the third image data. The system memory is accessible by the core logic unit, and comprises a graphics accelerating memory in communication with the second portion of the tile converter for storing therein the fourth image data.

In an embodiment, the core logic unit, the graphics accelerator and the tile converter are integrated into a single core logic chip.

In accordance with a third aspect of the present invention, there is provided a core logic chip for use in a personal computer system comprising a system memory and a local memory. The core logic chip is integrated therein a core logic unit, a graphics accelerator, a first tile converter and a second tile converter. The core logic unit outputs first image data in a linear mode. The graphics accelerator is in communication with the core logic unit, and processes the first image data into second image data in a linear mode. The first tile converter is in communication with the graphics accelerator, converts the second image data into third image data in a tile mode, and outputs the third image data to the local memory to be stored. The second tile converter is in communication with the core logic unit, converts the first image data into fourth image data in a tile mode, and outputs the fourth image data to the system memory to be stored.

In an embodiment, the local memory is disposed in the system memory, and the third image data are stored in the local memory in the system memory.

In an embodiment, the fourth image data is stored in an AGP (Accelerated Graphics Port) memory disposed in the system memory.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
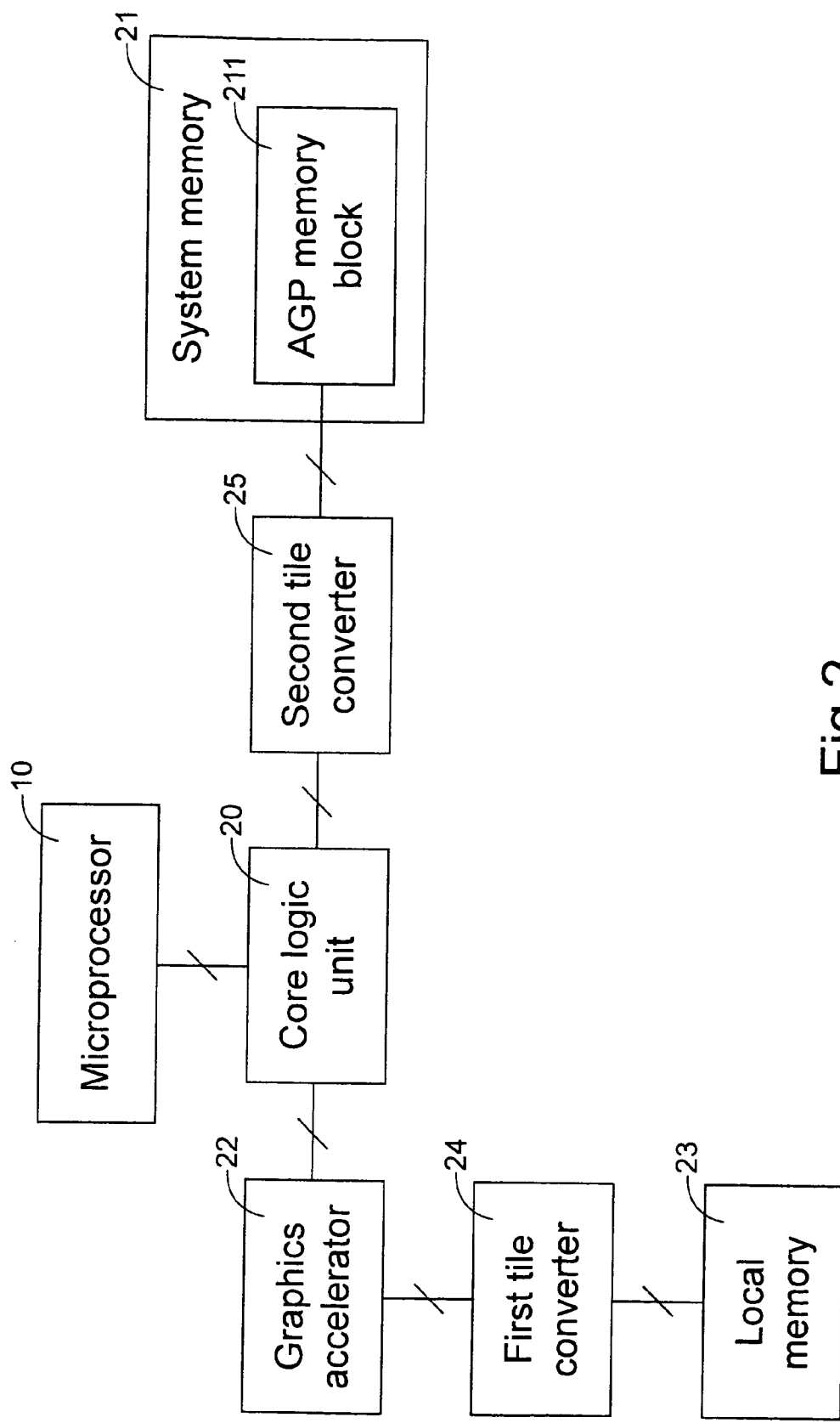
FIG. 2 is a functional block diagram illustrating a personal computer system according to a first preferred embodiment of the present invention.

Referring to FIG. 2, the personal computer system according to a preferred embodiment of the present invention comprises a microprocessor 10, a core logic unit 20 comprising a north bridge chip and a south bridge chip (not shown), a system memory 21 of the computer system accessible by the core logic unit 20, a graphics accelerator 22, a local memory 23, a first tile converter 24 and a second tile converter 25. The graphics accelerator 22, local memory 23 and the first tile converter 24, for example, can be disposed in a graphics card (not shown). The operation principle of the personal computer system will be illustrated as follows in more details.

Figure 1:
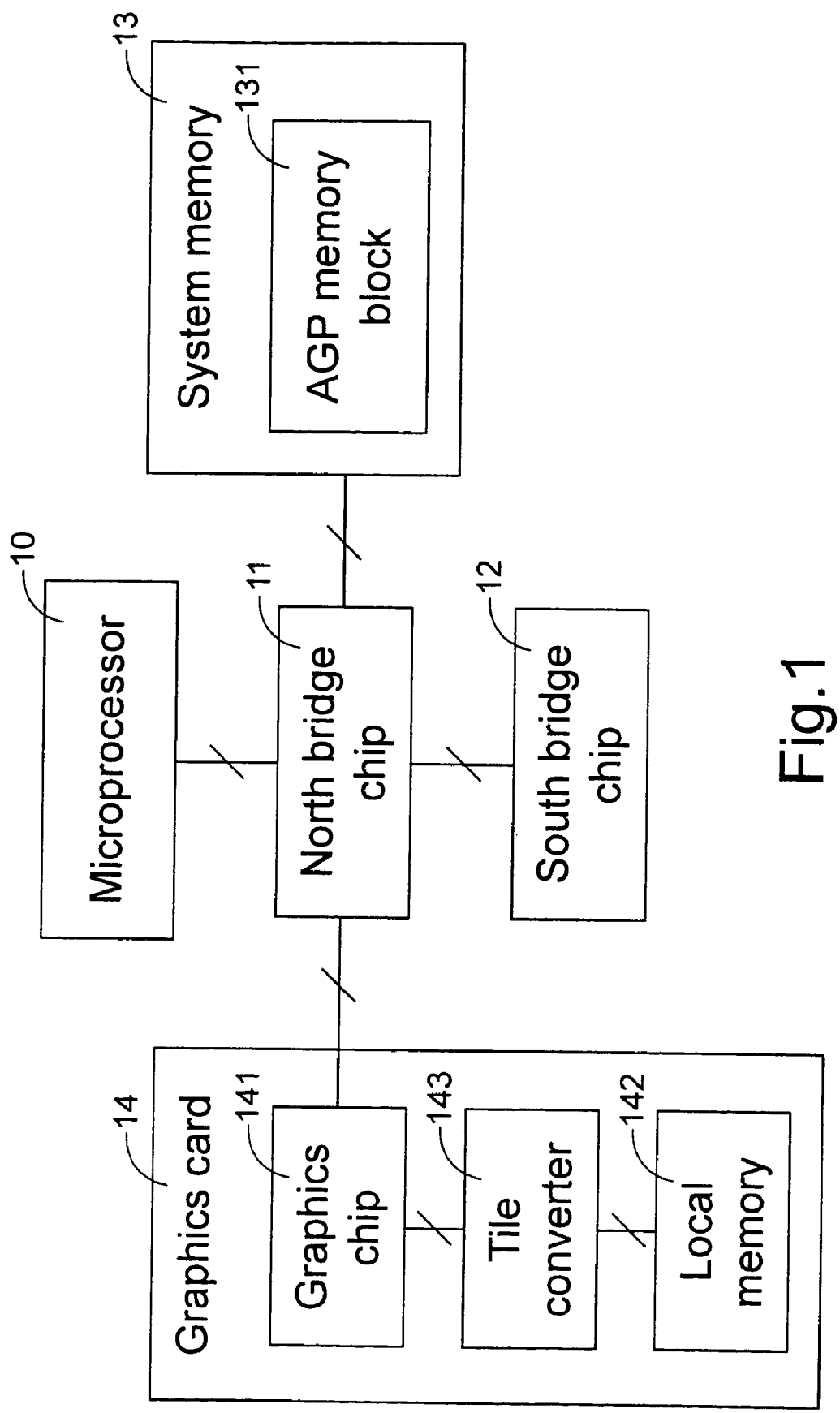
FIG. 1 is a functional block diagram illustrating a conventional personal computer system.

The microprocessor 10 accesses image data of the system memory 21 or outputs graphing commands to the graphics accelerator 22 via the core logic unit 20. The core logic unit 20 outputs image data in a linear mode. The graphics accelerator 22, for example a graphics chip in the graphics card (FIG. 1), is in communication with the core logic unit 20 for processing the image data in a linear mode outputted from the core logic unit 20. The image data in a linear mode is converted to image data in a tile mode by means of the first tile converter 24, and then transmitted and stored into the local memory 23. Alternatively, the image data can also be stored into an AGP (Accelerated Graphics Port) memory block 211 of the system memory 21, and accessed by the core logic unit 20 via an AGP protocol. For achieving this purpose, the second tile converter 25 is arranged between the core logic unit 20 and the system memory 21 for converting the image data in a linear mode into image data in a tile mode. Since the linear-mode image data from the core-logic unit 20 is converted into tile-mode image data to be stored in the AGP memory block 211 by means of the second tile converter 25 in advance, no software transformation operation from a linear mode to a tile mode is required. Thus, the processing speed of the personal computer system will be effectively enhanced so as to make use of resource.

Figure 3:
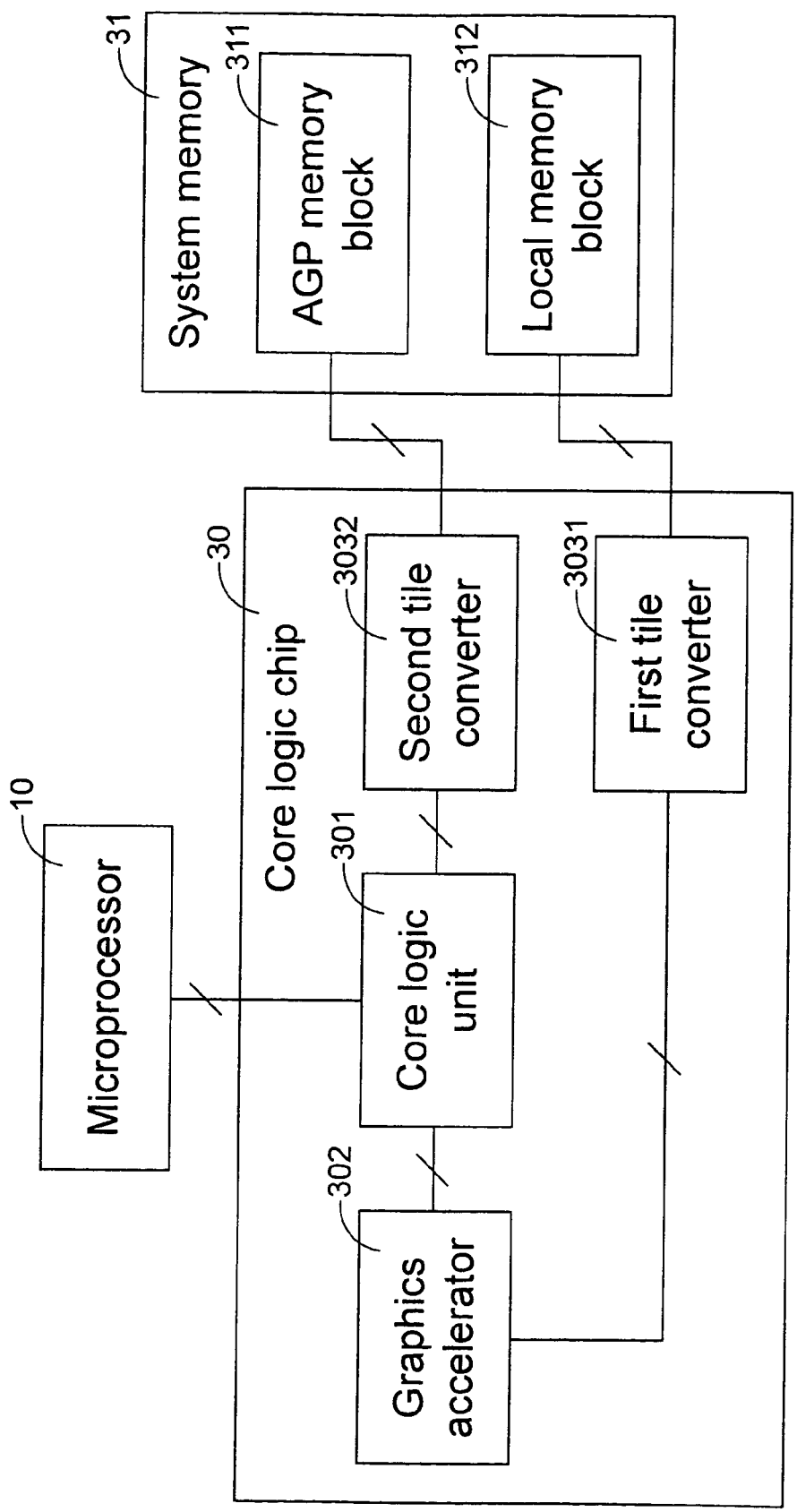
FIG. 3 is a functional block diagram illustrating a personal computer system according to a second preferred embodiment of the present invention.

Referring to FIG. 3, the personal computer system according to another preferred embodiment of the present invention comprises a microprocessor 10, a core logic chip 30 and a system memory 31. In addition to a core logic unit 301, a graphics accelerator 302, a first tile converter 3031 and a second tile converter 3032 are integrated into the core logic chip 30. In this embodiment, an AGP memory block 311 and a local memory block 312 are both defined in the system memory 31. The microprocessor 10 accesses image data of the system memory 31 or outputs graphing commands to the graphics accelerator 302 via the core logic unit 301. The core logic unit 301 outputs image data in a linear mode. The graphics accelerator 302, for example a graphics chip, is in communication with the core logic unit 301 for processing the image data outputted from the core logic unit 301. The image data in a linear mode is converted to image data in a tile mode by means of the first tile converter 3031, and then transmitted and stored into the local memory block 312 disposed in the system memory 31. Alternatively, the image data can also be stored into the AGP memory block 311 of the system memory 31, and accessed by the core logic unit 301 via an AGP protocol. For achieving this purpose, the second tile converter 3032 is arranged between the core logic unit 301 and the AGP memory block 311 for converting the image data in a linear mode into image data in a tile mode. In such way, no software transformation operation from a linear mode to a tile mode is required so as to save resource.

Figure 4:
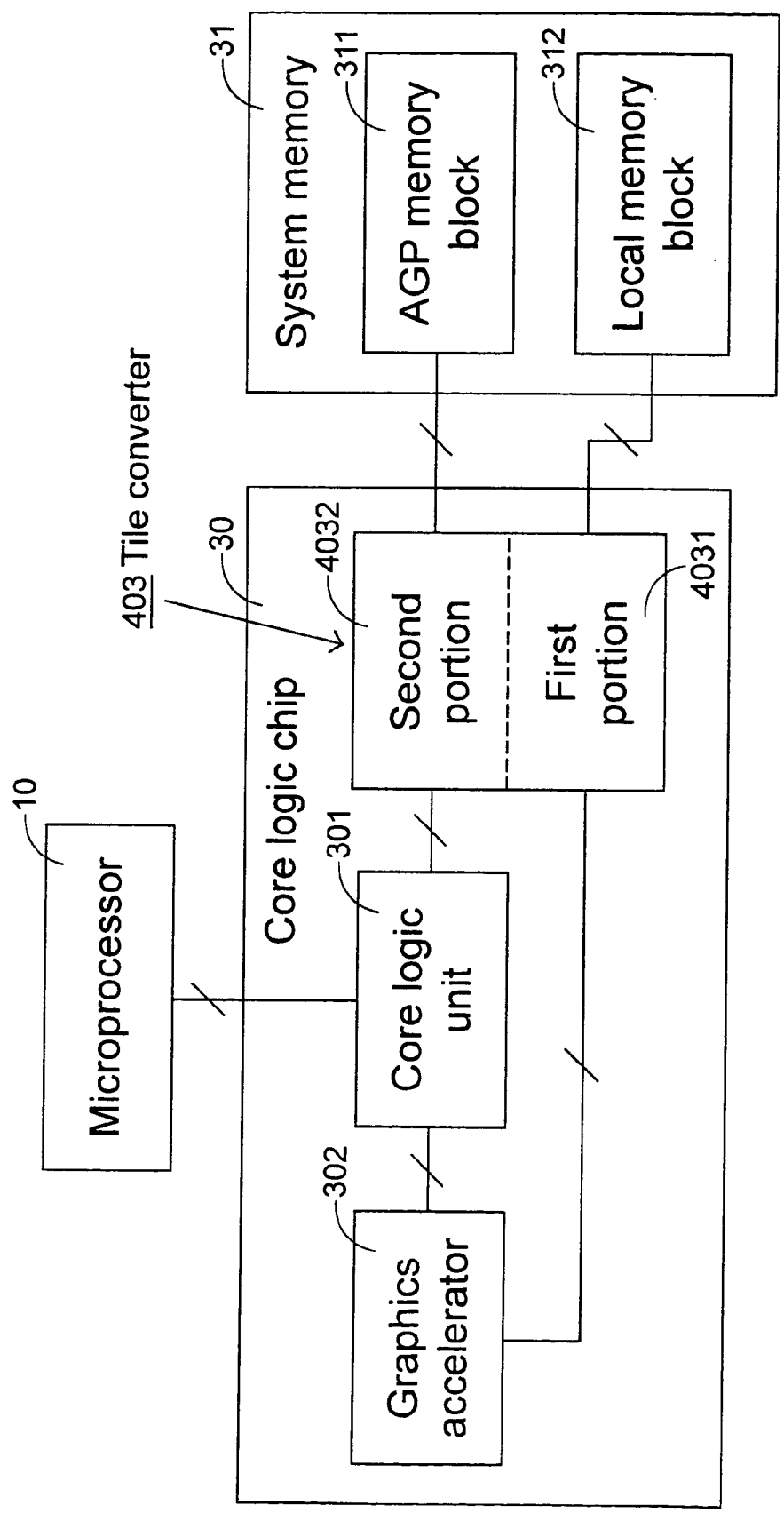
FIG. 4 is a functional block diagram illustrating a personal computer system according to a third preferred embodiment of the present invention.

Referring to FIG. 4, a further embodiment of the personal computer system according to the present invention is shown. This personal computer system is similar to that shown in FIG. 3 except that a single tile converter rather than two separate tile converters are used to converting the data to be stored in the AGP memory block 311 and the local memory block 312, respectively. The single tile converter 403 includes a first portion 4031 and a second portion 4032. The image data in a linear mode from the graphics accelerator 302 is transmitted to the first portion 4031 of the tile converter 403 to be converted into image data in a tile mode, and stored into the local memory block 312. On the other hand, the image data in a linear mode directly from the core logic unit 301 is transmitted to the second portion 4032 of the tile converter 403 to be converted into the image data in a tile mode and stored in the AGP memory block 311. In such way, no software transformation operation from a linear mode to a tile mode is required so as to save resource.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A personal computer system comprising:
a microprocessor;
a core logic unit outputting first image data in a linear mode;

a graphics accelerator in communication with said core logic unit for processing said first image data into second image data in a linear mode;

a first tile converter in communication with said graphics accelerator for converting said second image data into third image data in a tile mode;

a local memory in communication with said first tile converter for storing therein said third image data;

a second tile converter in communication with said core logic unit for converting said first image data received from said core logic unit into fourth image data in a tile mode; and a system memory accessible by said microprocessor via said core logic unit and said second tile converter that is disposed between said core logic unit and said system memory, and comprising a graphics accelerating memory for storing therein said fourth image data received from said second tile converter.

2. The personal computer system according to claim 1 wherein said core logic unit includes a north bridge chip.

3. The personal computer system according to claim 1 wherein said graphics accelerator is a graphics chip.

4. The personal computer system according to claim 1 wherein said graphics accelerator, said first tile converter and said local memory are integrated into a graphics card.

5. The personal computer system according to claim 1 wherein said core logic unit, said graphics accelerator, said first tile converter and said second tile converter are integrated into a single core logic chip.

6. The personal computer system according to claim 1 wherein said local memory is disposed in said system memory.

7. The personal computer system according to claim 6 wherein said first tile converter and said second tile converter are integrated into a single tile converting device.

8. The personal computer system according to claim 1 wherein said graphics accelerating memory is an AGP (Accelerated Graphics Port) memory in communication with said core logic unit via an AGP protocol.

9. A personal computer system comprising:
a microprocessor;
a core logic unit outputting first image data in a linear mode;
a graphics accelerator in communication with said core logic unit for processing said first image data into second image data in a linear mode;
a tile converting device having a first portion in communication with said graphics accelerator for converting said second image data into third image data in a tile mode and a second portion in communication with said core logic unit for converting said first image data received from said core logic unit into fourth image data in a tile mode;
a local memory in communication with said first portion of said tile converter for storing therein said third image data; and a system memory accessible by said microprocessor via said core logic unit and said second portion of said tile converter that is disposed between said core logic unit and said system memory, and comprising a graphics accelerating memory for storing therein said fourth image data received from said second portion of said tile converter.

10. The personal computer system according to claim 9 wherein said core logic unit includes a north bridge chip.

11. The personal computer system according to claim 9 wherein said graphics accelerator is a graphics chip.

12. The personal computer system according to claim 9 wherein said core logic unit, said graphics accelerator and said tile converter are integrated into a single core logic chip.

13. The personal computer system according to claim 9 wherein said graphics accelerating memory is an AGP (Accelerated Graphics Port) memory in communication with said core logic unit via an AGP protocol.

14. The personal computer system according to claim 9 wherein said local memory is disposed in said system memory.

15. A core logic chip for use in a personal computer system, said personal computer system comprising a microprocessor, a system memory and a local memory, said core logic chip being integrated therein:
a core logic unit coupled to the microprocessor by a first end thereof and outputting first image data in a linear mode;
a graphics accelerator in communication with a second end of said core logic unit, processing said first image data into second image data in a linear mode;
a first tile converter in communication with said graphics accelerator, converting said second image data into third image data in a tile mode, and outputting said third image data to said local memory to be stored; and
a second tile converter in communication with a third end of said core logic unit, converting said first image data received from said core logic unit into fourth image data in a tile mode, and outputting said fourth image data to said system memory to be stored.

16. The core logic chip according to claim 15 wherein said first tile converter and said second tile converter are integrated into a single tile converting device.

17. The core logic chip according to claim 15 wherein said local memory is disposed in said system memory, and said third image data are stored in said local memory in said system memory.

18. The core logic chip according to claim 15 wherein said fourth image data is stored in an AGP (Accelerated Graphics Port) memory disposed in said system memory.

* * * * *